United States Patent [19]
Peercy et al.

[11] Patent Number: 5,960,429
[45] Date of Patent: Sep. 28, 1999

[54] MULTIPLE REFERENCE HOTLIST FOR IDENTIFYING FREQUENTLY RETRIEVED WEB PAGES

[75] Inventors: Michael P. Peercy, Cupertino; Benjamin Clay Reed, San Jose, both of Calif.; Edward Robinson, Gaithersburg, Md.; Hovey Raymond Strong, Jr., San Jose, Calif.

[73] Assignee: International Business Machines Corporation, Armonk, N.Y.

[21] Appl. No.: 08/948,106

[22] Filed: Oct. 9, 1997

[51] Int. Cl.⁶ ...................................................... G06F 17/30
[52] U.S. Cl. .............................. 707/5; 707/10; 707/501; 707/513; 395/200.47; 395/200.48
[58] Field of Search .............. 707/10, 5, 6, 501, 707/513; 395/200.3, 200.32, 200.33, 200.47, 200.48

[56] References Cited

U.S. PATENT DOCUMENTS

| | | | |
|---|---|---|---|
| 5,408,655 | 4/1995 | Oren et al. | 707/501 |
| 5,675,510 | 10/1997 | Coffey et al. | 395/200.54 |
| 5,708,780 | 1/1998 | Levergood et al. | 395/200.12 |
| 5,727,129 | 3/1998 | Barrett et al. | 706/10 |
| 5,748,954 | 5/1998 | Mauldin | 707/10 |

OTHER PUBLICATIONS

U.S. Patent Application Serial No. 08/245,287, Filed May 17, 1994, Attorney Docekt No. BC9–94–063.

U.S. Patent Application Serial No. 08/558,627, Filed Nov. 14, 1995, Attorney Docket No. RP9–95–040, entitled "Network Management Excercised Through Hyper Text Markup Language Method and Apparatus," by M. Medford et al.

U.S. Patent Application Serial No. 08/558,626, Filed Nov. 14, 1995, Attorney Docket No. RP9–95–041, entitled "Browsing And Control of Systems Management protocols Via A Web Browser Over The Internet," by M. Medfore et al.

U.S. Patent Application Serial No. 08/558,631, Filed Nov. 14, 1995, Attorney Docket No. RP9–95—42, entitled "Transmittal Of Hyper Text Markup Language Instructions Through LAN Protocols," by M. Medford et al.

U.S. Patent Application Serial No. 08/659,100, Filed Jun 4, 1996, Attorney Docket No. AM9–96–034, entitled "Communication Network System And Architecture for Recording And Displaying History Of Information Accessed," by R.C. Barret et al.

Jong–Gyun Lim, "Using Coollists to Index HTML Documents in the Web," *Computer Networks and ISDN Systems 28*, pp. 147–154, 1995.

Paul Klark, et al. "Developing a Personal Internet Assistant," *Educational Multimedia and Hypermedia*, pp. 372–377, Jun. 1995.

Kenichi Kamiya, et al. "Grassroots: A System Providing a Uniform Framework for Communicating, Structuring, Sharing Information, and Organizing People," *Computer Networks and ISDN Systems 28*, pp. 1157–1174, 1996.

*Primary Examiner*—Thomas G. Black
*Assistant Examiner*—Hosain T. Alam
*Attorney, Agent, or Firm*—Merchant & Gould

[57] ABSTRACT

A method, apparatus, and article of manufacture for locating web pages from a network server. A count of retrievals of a web page is accumulated and the accumulated count and an address for the web page are stored in a record of a history log database at the network server. A multiple reference hotlist is formatted from the records in the history log database, wherein the multiple reference hotlist comprises a list of addresses for web pages retrieved from the records and the list is sorted by the accumulated counts retrieved from the records. The multiple reference hotlist is then displayed for a user.

19 Claims, 3 Drawing Sheets

| NAME | URL | COUNTER |
|---|---|---|
| Mars_Pathfinder | http://mpfwww.mars.jpl.nasa.gov | 256,024 |
| The White House | http://www.whitehouse.gov | 125,917 |
| Yahoo!™ Finance | http://quote.yahoo.com | 54,283 |
| Yahoo!™ | http://www.yahoo.com | 175,062 |

| NAME | URL | COUNTER |
|---|---|---|
| Mars_Pathfinder | http://mpfwww.mars.jpl.nasa.gov | 256,024 |
| The White House | http://www.whitehouse.gov | 125,917 |
| Yahoo!™ Finance | http://quote.yahoo.com | 54,283 |
| Yahoo!™ | http://www.yahoo.com | 175,062 |

FIG. 2

MULTIPLE REFERENCE HOTLIST FOR IDENTIFYING FREQUENTLY RETRIEVED WEB PAGES

BACKGROUND OF THE INVENTION

1. Field of the Invention

This invention relates in general to web servers, and more particularly, to a multiple reference hotlist generated from a history log.

2. Description of Related Art

As the popularity and usefulness of the Internet grows, and more of the general public are able to access the Internet both at home and at work, the usefulness of the vast number of web pages and Uniform Resource Locators (URLs) becomes difficult to manage.

The typical way for a user to access a web page or web site is to use a search engine, or a list of web pages compiled by another user as "popular," to find a web page or site of interest, and then review the web page or use links in the web page to find other web pages of interest. Once a web page is found, the user can create a bookmark for the web page in their browser to recall the location of the page at some later date.

However, there are hundreds of thousands of websites on the Internet, with millions of web pages located at those web sites, and finding the web pages that are popular is difficult.

Once a user arrives at a particular web site, the user must traverse a typically static navigation structure, set up by the website designer, to get to a web page of interest. This process is slow and sometimes confusing, and requires additional time for each user to traverse from the web site to the web page of interest.

It can be seen, then, that there is a need for a better way to find popular web pages and web sites on the Internet. It can also be seen that certain pages should be marked as "hot spots" for all users. It can also be seen, then, that there is a need for finding popular web pages at a particular web site. It can also be seen, then, that there is a need to expedite and clarify the path from the web site to a given web page.

SUMMARY OF THE INVENTION

To minimize the limitations in the prior art described above, and to minimize other limitations that will become apparent upon reading and understanding the present specification, the present invention discloses a method, apparatus, and article of manufacture for locating web pages from a network server. A count of retrievals of a web page is accumulated and the accumulated count and an address for the web page are stored in a record of a history log database at the network server. A multiple reference hotlist is formatted from the records in the history log database, wherein the multiple reference hotlist comprises a list of addresses for web pages retrieved from the records and the list is sorted by the accumulated counts retrieved from the records. The multiple reference hotlist is then displayed for a user.

BRIEF DESCRIPTION OF THE DRAWINGS

Referring now to the drawings in which like reference numbers represent corresponding parts throughout:

FIG. 2 shows one possible structure of the history log database according to the present invention.

DETAILED DESCRIPTION OF THE PREFERRED EMBODIMENT

Figure 1:
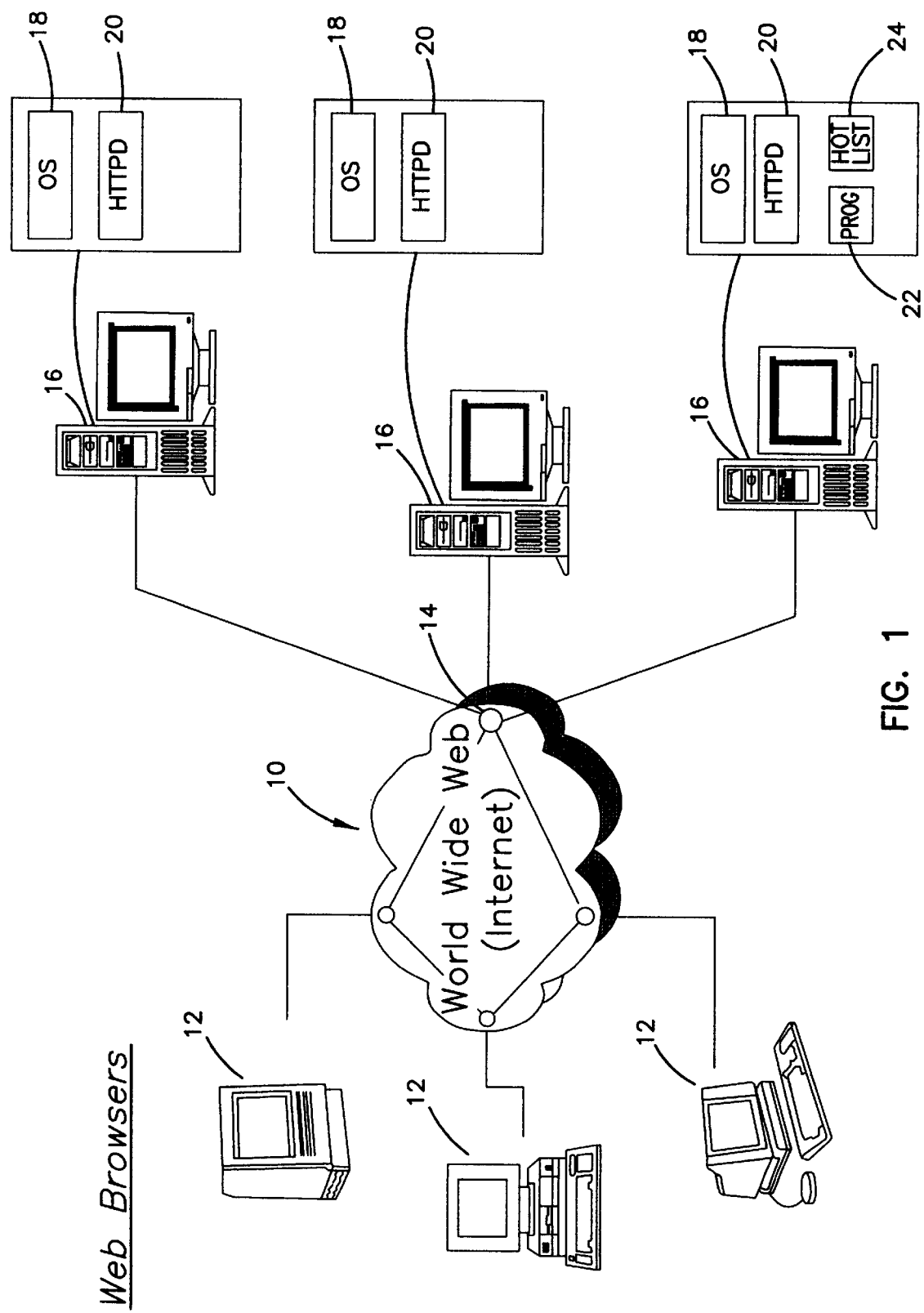
FIG. 1 is a block diagram of an exemplary hardware environment of the preferred embodiment of the present invention, and more particularly, illustrates a typical distributed computer system.

In the description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Overview

When an Internet user retrieves web pages, they use a browser to transmit HyperText Transfer Protocol (HTTP) commands from their computer to a web server executed by a connected computer. In turn, the web server responds with a HyperText Mark-up Language (HTML) (or other formatted) page that is transmitted to the browser for display to the user.

Typically, users access web pages by using a search engine (Yahoo!™, AltaVista™, etc.) to find pages regarding a topic of interest. If the web page is of some interest to the user, they "bookmark" the HTTP Uniform Resource Locator (URL) for that page in their browser in order to easily find the web page in the future.

However, individual users have few resources to determine what web pages are the most popular. Generally, popular web page must be found through trial and error by the individual user, or through lists manually created by other individual users or service providers (e.g., Yahoo!™ weekly picks). Web page popularity is not available to individual users because there is no centralized history logging of the number of retrievals ("hits") of a given web page, nor is there any way to create a "hotlist" from such centralized logging.

For example, one web page of recent popularity is identified by the URL "http://www.mars.jpl.nasa.gov" and contains pictures obtained from the Mars Pathfinder spacecraft. It was reported that this web page (and others associated with it) received over 1 million "hits" in one week (i.e., was retrieved 1 million times by users in one week). The web page contains hyperlinks to other web pages that display the number of hits allowed per site, e.g., the web page identified by the URL "http://mars.sgi.com" can accept 20,000,000 hits per day without overloading the web server.

Each user that visited the Mars Pathfinder web page either obtained the information by using a search engine or from another user or from an external source. However, in the present invention, by generating a "multiple reference hotlist" from a history log that accumulates the total number of retrievals made of any number of different web pages, popular web sites can be accessed directly without the need of a search engine.

Such a multiple reference hotlist can be useful both to users of the Internet in a local and a global sense. For example, a hotlist of popular web pages can serve as a guide to web pages of local, regional, national, or global interest in a given subject. In another example, the multiple reference hotlist can be used by both novice and experienced users for traversing the Internet. Further, some web pages are "hot spots" that any user would want to access quickly, even though the user would normally have to follow a long chain of links or accesses to find them. The present invention will also provide particular usefulness to websites that offer descriptions of items for sale from a constantly changing inventory. These "hot spots" will change over time and are dependent on the set of users and the application.

There are other considerations that also relate to the popularity of a given web page. Some web pages are visited by mistake, or for a very short time, which would give a false popularity "score" to those web pages. The multiple reference hotlist can take into account these and other parameters, e.g., the length of time that the web page was visited, the length of time between retrievals of a web page and another web page, etc., so that a true popularity "score" can be used to sort the multiple reference hotlist.

Hardware Environment

FIG. 1 is a block diagram of an exemplary hardware environment of the preferred embodiment of the present invention, and more particularly, illustrates a typical distributed computer system 10, wherein client computers 12 are connected via a network 14 to server computers 16. A typical combination of resources may include clients 12 that are personal computers or workstations, and servers 16 that are personal computers, workstations, minicomputers, and/or mainframes. These network 14 preferably comprises the Internet, although it could also comprise intra-nets, LANs, WANs, SNA networks, etc.

Each of the computers, be they client 12 or server 16, generally include, inter alia, a processor, random access memory (RAM), data storage devices, data communications devices, monitor, user input devices, etc. Those skilled in the art will recognize that any combination of the above components, or any number of different components, peripherals, and other devices, may be used with the client 12 and server 16.

Each of the computers, be they client 12 or server 16, operate under the control of an operating system (OS), such as OS/390, AIX, UNIX, OS/2, Windows, etc. The operating system is booted into the memory of the computer for execution when the computer is powered-on or reset. In turn, the operating system then controls the execution of one or more computer programs by the computer.

In the present invention, the operating system (not shown) of the client 12 controls the execution of a web browser and the operating system 18 of the server 16 controls the execution of a web server 20. The web browser is typically a computer program such as IBM's Web Explorer, NetScape, Internet Explorer, Mosaic, etc. The web server 20 is typically a computer program such as IBM's HTTP Daemon™ or other World Wide Web (WWW) daemon.

The present invention is usually (although not necessarily) implemented by a computer program 22 and its associated history log database 24 that are executed, interpreted, and/or stored in at least one of the servers 16 under the control of that server's operating system 18. This computer program 22, which may be a separate computer program 22 or may be implemented within the operating system 18 or the web server 20, and its associated database 24 causes the server 16 to perform the desired functions as described herein.

The operating system 18, web server 20, and computer program 22 are comprised of instructions which, when read and executed by the server 16, causes the server 16 to perform the steps necessary to implement and/or use the present invention. Generally, the operating system 18, web server 20, computer program 22, and/or database 24 are tangibly embodied in and/or readable from a device, carrier, or media, such as a memory, data storage device, and/or data communications device connected to the server 16. Under control of the operating system 18, the web server 18, computer program 22, and/or database 24 may be loaded from the memory, data storage device, and/or data communications device into the memory of the server 16 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Data Structure

FIG. 2 shows one possible structure of the history log database 24 according to the present invention. The database may be a table comprised of rows and columns, although other structures may also be used. In the database 24 illustrated herein, each row of the table typically includes a name or title for the web page 26, an HTTP URL 28 for the web page, and a counter 30 that is incremented every time the web page is accessed. Rows are created for each web page accessed by a user and are updated each time the web page is accessed.

The records in the history log database 24 are used to generate the multiple reference hotlist of the present invention, wherein the hotlist displays the title 26, URL 28, and counter 30 for the most popular web pages. In creating the multiple reference hotlist from the history log database 24, the rows would preferably be sorted by the value in the counter 30 to indicate the popularity for each web page.

In addition, a cutoff value could be established for the counter 30 to eliminate less-popular web pages from the multiple reference hotlist. For example, if a cutoff value of 100,000 were used with the example rows of FIG. 2, the Yahoo!™ Finance web page would not be used to create the multiple reference hotlist. Depending on the cutoff value used, different multiple reference hotlists would be displayed to the user.

Each row of the history log database 24 could also include a timestamp to indicate how long the web page was displayed, in order to provide a "quality of visit" parameter for the database 24. This quality of visit parameter could be used, inter alia, to allow the database 24 to show a nested page as the popular site, rather than a home page. This allows the multiple reference hotlist to more accurately portray the popular web pages.

Flowchart

Figure 3:
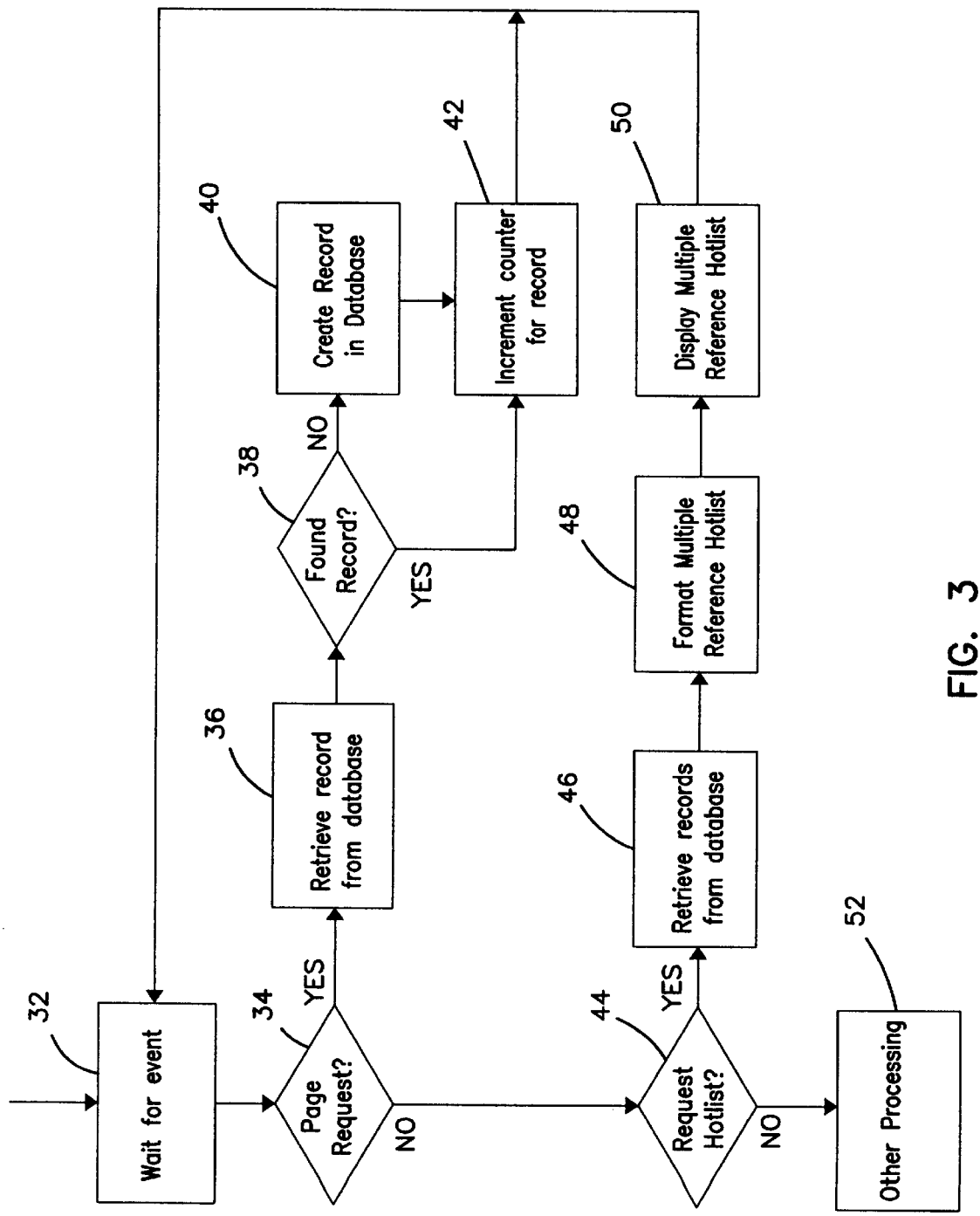
FIG. 3 is a flowchart illustrating the logic performed in creating the history log database and the multiple reference hotlist according to the present invention.

FIG. 3 is a flowchart illustrating the logic performed in creating the history log database 24 and the multiple reference hotlist according to the present invention. As indicated above, this logic could be performed by the computer program 22, the web server 20, and/or the operating system 18 in various implementations. However, for the purposes of illustration only, the logic will be described in conjunction with the computer program 22.

Block 32 represents the computer program 22 waiting for an event to occur. After an event occurs, control is transferred to Blocks 34-52.

Block 34 is a decision block that represents the computer program 22 determining whether the event was a user's request for a web page. If so, control is transferred to Block 36; otherwise, control is transferred to Block 44. Block 36 represents the computer program 22 attempting to retrieve a record for the requested page from the history log database 24. Block 38 is a decision block that represents the computer program 22 determining whether the record was found in the history log database 24. If not, control is transferred to Block 40; otherwise control is transferred to Block 42. Block 40 represents the computer program 22 creating the record for the web page in the history log database 24. Block 42 represents the computer program 22 incrementing the counter 30 in the record of the history log database 24 associated with the requested web page. Thereafter, control is transferred back to Block 32.

Block 44 is a decision block that represents the computer program 22 determining whether the event was a request by the user to display the multiple reference hotlist. If so, control is transferred to Block 46; otherwise, control is transferred to Block 52. Block 46 represents the computer program 22 retrieving one or more records from the history log database 24. Block 48 represents the computer program 22 formatting the retrieved records from the database 24 into a multiple reference hotlist that can be presented to the user for display. Block 50 represents the computer program 22 transmitting the multiple reference hotlist to the user for display. Thereafter, control is transferred to Block 32.

Block 52 represents the computer program 22 performing other processing as required. Thereafter, control is transferred to Block 32.

Conclusion

In conclusion, the present invention discloses a method, apparatus, and article of manufacture for locating web pages from a network server. A count of retrievals of a web page is accumulated and the accumulated count and an address for the web page are stored in a record of a history log database at the network server. A multiple reference hotlist is formatted from the records in the history log database, wherein the multiple reference hotlist comprises a list of addresses for web pages retrieved from the records and the list is sorted by the accumulated counts retrieved from the records. The multiple reference hotlist is then displayed for a user.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for identifying web pages from a network server, comprising the steps of:

accumulating a count of retrievals of one or more web pages, wherein the count is incremented for each web page each time that web page is retrieved by any user;

storing the accumulated count and an address for each web page in a record of a history log database associated with that web page and stored by the network server;

generating a multiple reference hotlist by selecting web pages based on their accumulated counts, wherein the multiple reference hotlist comprises a list of addresses for web pages retrieved from the records and wherein the list is sorted by the accumulated counts retrieved from the records; and displaying the multiple reference hotlist for a user.

2. The method of claim 1, wherein the step of accumulating further comprises the step of accumulating the count of retrievals whenever a user requests the web page.

3. The method of claim 1, wherein the step of storing further comprises the step of storing a title for the web page.

4. The method of claim 3, wherein the step of displaying further comprises the step of displaying the title for each web page in the multiple reference hotlist.

5. The method of claim 1, wherein the step of accumulating further comprises the step of accumulating a time between retrievals of the web page and another web page, and the step of storing further comprises the step of storing the accumulated time in the record of the history log database.

6. The method of claim 1, wherein the step of formatting further comprises the step of limiting the list to records that have an accumulated count that exceeds a cutoff value.

7. A computerized apparatus for identifying web pages, comprising:

a network server;

a computer program, executed by the network server, for accumulating a count of retrievals of one or more web pages, wherein the count is incremented for each web page each item that web page is retrieved by any user, for storing the accumulated count and an address for each web page in a record of a history log database associated with that web page and stored by the network server, for generating a multiple reference hotlist by selecting web pages based on their accumulated counts wherein the multiple reference hotlist comprises a list of addresses for web pages retrieved from the records and wherein the list is sorted by the accumulated counts retrieved from the records, and for displaying the multiple reference hotlist for a user.

8. The apparatus of claim 7, wherein the computer program further comprises means for accumulating the count of retrievals whenever a user requests the web page.

9. The apparatus of claim 7, wherein the computer program further comprises means for storing a title for the web page.

10. The apparatus of claim 9, wherein the computer program further comprises means for displaying the title for each web page in the multiple reference hotlist.

11. The apparatus of claim 7, wherein the computer program further comprises means for accumulating a time between retrievals of the web page and another web page and means for storing the accumulated time in the record of the history log database.

12. The apparatus of claim 7, wherein the computer program further comprises means for limiting the list to records that have an accumulated count that exceeds a cutoff value.

13. An article of manufacture comprising a computer program carrier readable by a network server and tangibly embodying one or more computer programs executable by the network server to perform method steps for identifying web pages, the method steps comprising:

accumulating a count of retrievals of one or more web pages, wherein the count is incremented for each web page each time that web page is retrieved by any user;

storing the accumulated count and an address for each web page in a record of a history log database associated with that web page and stored by the network server;

generating a multiple reference hotlist by selecting web pages based on their accumulated counts, wherein the multiple reference hotlist comprises a list of addresses for web pages retrieved from the records and wherein the list is sorted by the accumulated counts retrieved from the records; and displaying the multiple reference hotlist for a user.

14. The article of manufacture of claim 13, wherein the step of accumulating further comprises the step of accumulating the count of retrievals whenever a user requests the web page.

15. The article of manufacture of claim 13, wherein the step of storing further comprises the step of storing a title for the web page.

16. The article of manufacture of claim 15, wherein the step of displaying further comprises the step of displaying the title for each web page in the multiple reference hotlist.

17. The article of manufacture of claim 13, wherein the step of accumulating further comprises the step of accumulating a time between retrievals of the web page and another web page, and the step of storing further comprises the step of storing the accumulated time in the record of the history log database.

18. The article of manufacture of claim 13, wherein the step of formatting further comprises the step of limiting the list to records that have an accumulated count that exceeds a cutoff value.

19. A computer-readable memory for storing a computer program that identifies web pages from a network server, comprising;

a data structure stored in the memory of the network server, the data structure including an accumulated count of retrievals of one or more web pages and an address for each web page, wherein a multiple reference hotlist is generated from the data structure for display to a user, wherein the multiple reference hotlist comprises a list of addresses for web pages retrieved from the data structure based on their accumulated counts and wherein the list is sorted by the accumulated counts retrieved from the data structure.

* * * * *